United States Patent
Yu et al.

(10) Patent No.: US 10,404,356 B2
(45) Date of Patent: Sep. 3, 2019

(54) VESSEL COMMUNICATIONS SYSTEMS AND METHODS

(71) Applicant: McMurdo, Inc., Beltsville, MD (US)

(72) Inventors: Alan Yu, Escondido, CA (US); J. Joel Faul, Vista, CA (US)

(73) Assignee: McMurdo, Inc., Beltsville, MD (US)

( * ) Notice: Subject to any disclaimer, the term of this patent is extended or adjusted under 35 U.S.C. 154(b) by 0 days.

(21) Appl. No.: 15/728,393

(22) Filed: Oct. 9, 2017

(65) Prior Publication Data

US 2018/0034535 A1 Feb. 1, 2018

Related U.S. Application Data (62) Division of application No. 14/335,778, filed on Jul. 18, 2014, now Pat. No. 9,787,391.

(51) Int. Cl.
  *G08G 3/00* (2006.01)
  *H04B 7/185* (2006.01)
  *G08G 3/02* (2006.01)

(52) U.S. Cl.
  CPC .......... *H04B 7/18513* (2013.01); *G08G 3/02* (2013.01)

(58) Field of Classification Search
  CPC ........ G08G 3/00; G08G 3/02; H04B 7/18513; H04B 7/1853
  USPC ......... 342/357.21, 357.24, 357.71, 386, 387; 701/468, 470
  See application file for complete search history.

(56) References Cited

U.S. PATENT DOCUMENTS

| | | | |
|---|---|---|---|
| 7,805,146 B1 | 9/2010 | Beyer, Jr. | |
| 8,374,292 B2 | 2/2013 | Peach | |
| 2011/0257819 A1 | 10/2011 | Chen et al. | |
| 2012/0033813 A1 | 2/2012 | Calmettes | |
| 2012/0239285 A1 | 9/2012 | Oster | |
| 2013/0002476 A1 | 1/2013 | Laine | |
| 2015/0309198 A1* | 10/2015 | Renaud | G01V 1/223 367/15 |
| 2016/0018505 A1 | 1/2016 | Yu et al. | |

FOREIGN PATENT DOCUMENTS

CN 201892871 7/2011

OTHER PUBLICATIONS

Bertsimas et al., "Simulated Annealing", Statistical Science vol. 8, No. 1, 1993, United States, pp. 10-15.

* cited by examiner

*Primary Examiner* — Dao L Phan
(74) *Attorney, Agent, or Firm* — Wells St. John P.S.

(57) ABSTRACT

Vessel communications systems and methods are described. According to one aspect, a vessel communications method includes receiving a first inbound wireless communication within a subject vessel, the first inbound wireless communication comprising positional data regarding a location of a first vessel, receiving a second inbound wireless communication within the subject vessel, the second inbound wireless communication comprising positional data regarding a location of a second vessel, selecting the positional data of the first vessel but not the positional data of the second vessel and after the selecting, outputting an outbound wireless communication comprising the positional data of the first vessel but not the positional data of the second vessel.

17 Claims, 6 Drawing Sheets

VESSEL COMMUNICATIONS SYSTEMS AND METHODS

RELATED PATENT DATA

This application is a divisional of and claims priority to U.S. patent application Ser. No. 14/335,778, filed Jul. 18, 2014, the teachings of which are incorporated herein by reference.

TECHNICAL FIELD

This disclosure relates to vessel communications systems and methods.

BACKGROUND OF THE DISCLOSURE

Various systems are utilized to track the positions of vessels, vehicles, etc. One example is an Automatic Identification System (AIS) which is a tracking system used on ships for identifying and locating the ships by electronically exchanging data with other nearby ships. AIS monitoring systems receive data from the ships tracked by AIS base stations located along coast lines or, when out of range of terrestrial networks, through satellites that are fitted with special AIS receivers.

Aspects of the disclosure are directed towards vessel tracking systems, vessel communications systems and associated methods as described further below.

BRIEF DESCRIPTION OF THE DRAWINGS

Example embodiments of the disclosure are described below with reference to the following accompanying drawings.

DETAILED DESCRIPTION OF THE DISCLOSURE

This disclosure is submitted in furtherance of the constitutional purposes of the U.S. Patent Laws "to promote the progress of science and useful arts" (Article 1, Section 8).

Figure 1:
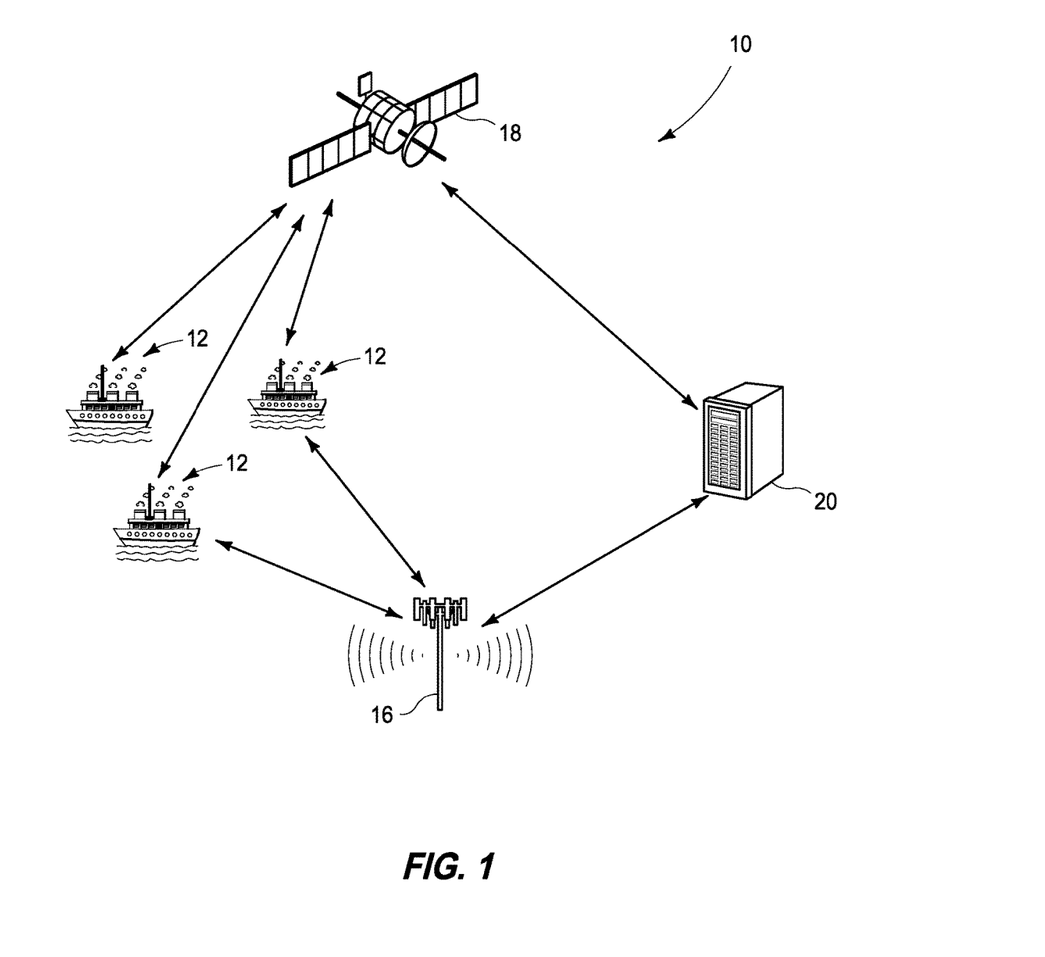
FIG. 1 is an illustrative representation of a tracking system according to one embodiment.

Referring to FIG. 1, an example embodiment of a position or location tracking system 10 is described. This embodiment is described with respect to tracking of a plurality of ships or vessels 12, although the systems and methods of the disclosure may be utilized to track other types of vehicles, such as trucks, in other embodiments.

In one embodiment, vessels 12 include location circuitry configured to provide positional data or information which is indicative of locations of the vessels 12. Example location circuitry includes Global Positioning System (GPS) circuitry configured to receive GPS signals and AIS circuitry configured to transmit and receive AIS signals. The GPS circuitry provides positional data of the respective vessel 12 at a plurality of moments in time and AIS signals may communicate positional data of vessels 12 to other vessels 12 within the communications range of the AIS circuitry. The positional data may be indicated as a latitude and longitude of the vessel 12 in one embodiment. The plurality of vessels 12 may be synchronized with one another in one arrangement such that positional data of the vessels 12 may be obtained at the same moments in time (e.g., at a common moment in time, the positional data of the plural vessels 12 may be generated for example using GPS and/or AIS).

It may be desirous to communicate this positional data generated by the location determining circuitry to locations which are remote from the vessels 12. Depending on the locations of the vessels 12 (e.g., on a river, ocean, or perhaps near a shoreline), the communications may be implemented via different communications networks, such as a terrestrial (e.g., cellular) wireless communications system 16 or a satellite wireless communications system 18.

In one embodiment, the positional data is communicated from the vessels 12 to a management system 20. Management system 20 monitors the locations of vessels 12 using the received positional data in one embodiment. For example, one or more of the vessels 12 may be part of an organization (e.g., fleet of vessels owned by a company) and the management system 20 may be part of the organization which monitors the vessels 12 or management system 20 may provide information to the organization regarding the locations of its vessels 12 as a service to the organization in illustrative examples.

In one embodiment, vessels 12 communicate their respective positional data indicative of their locations to other vessels 12 within range of the AIS communications of the vessels 12. Accordingly, one of the vessels 12 may have positional data regarding one or more other vessels 12. In one embodiment, it is desirous for one of the vessels 12 to communicate the positional data regarding itself as well as positional data regarding the other vessels 12 to the management system 20. Furthermore, it may be desirous in some embodiments to restrict other vessels 12 from communicating redundant positional data regarding the same vessels 12 as described further below. For example, communications via systems 16, 18 may be relatively expensive, and some aspects of the disclosure are directed towards reducing the communication of redundant positional data and associated bandwidth used to communicate the redundant positional data from the vessels 12 to the management system 20.

Some aspects of the disclosure utilize less amounts of communicated data and bandwidth to communicate the positional data of the vessels 12 to the management system 20 compared with some other communications systems and methods which do not restrict the amount of AIS data which is communicated, for example, which may include plural communications from plural vessels 12 which include the same positional data regarding one or more vessels 12.

In one embodiment, management system 20 manages or controls the communications of the positional data from the vessels 12 to the management system 20. The communications of the vessels 12 may be controlled to reduce or avoid transmission of duplicative or redundant positional data regarding one or more vessels 12 in example embodiments described below. For example, in one embodiment, the management system 20 creates transmission rules which are communicated to the vessels 12 and control subsequent communications of the vessels 12 to the management system 20.

Figure 2:
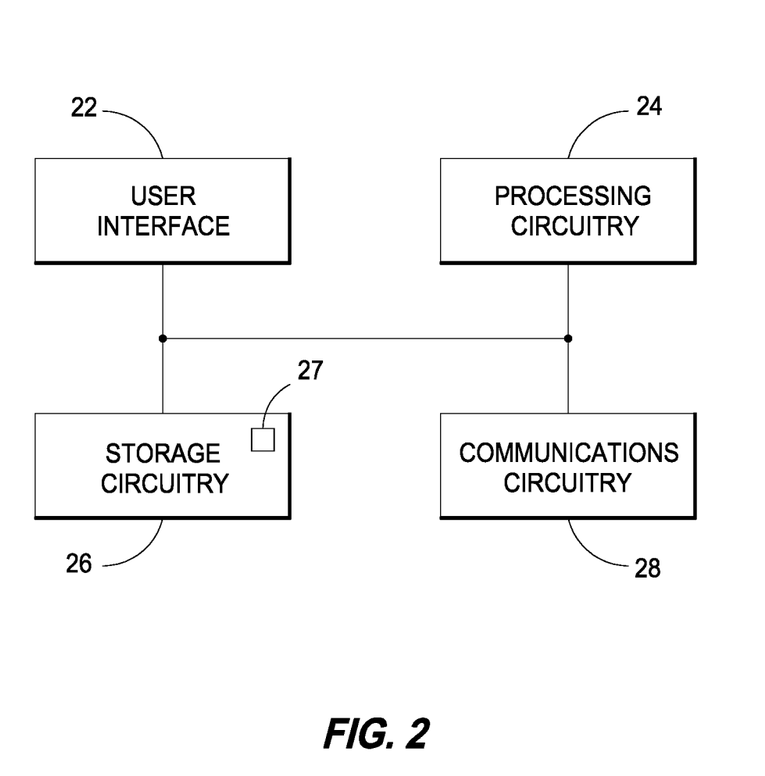
FIG. 2 is a functional block diagram of hardware components of a computing system of a vessel or a management system according to one embodiment.

Referring to FIG. 2, components of one embodiment of a computing system are shown. In the illustrated example embodiment, the components include a user interface 22, processing circuitry 24, storage circuitry 26, and communications circuitry 28. Other embodiments are possible including more, less and/or alternative components. In one embodiment, one or more of the computing systems may be implemented within vessels 12 and/or management system 20 and configured to implement and control tracking and communications described herein.

User interface 22 is configured to interact with a user including conveying data to a user (e.g., displaying visual images including maps of vessels and their positional data for observation by the user) as well as receiving inputs from the user. User interface 22 is configured as graphical user interface (GUI) in one embodiment. User interface 22 may be configured differently in other embodiments.

In one embodiment, processing circuitry 24 is arranged to process data, control data access and storage, issue commands, and control other desired operations. Processing circuitry 24 may comprise circuitry configured to implement desired programming provided by appropriate computer-readable storage media in at least one embodiment. For example, the processing circuitry 24 may be implemented as one or more processor(s) and/or other structure configured to execute executable instructions including, for example, software and/or firmware instructions. Other example embodiments of processing circuitry 24 include hardware logic, PGA, FPGA, ASIC, state machines, and/or other structures alone or in combination with one or more processor(s). These examples of processing circuitry 24 are for illustration and other configurations are possible.

Storage circuitry 26 is configured to store programming such as executable code or instructions (e.g., software and/or firmware), electronic data, databases, positional data, or other digital information and may include computer-readable storage media. At least some embodiments or aspects described herein may be implemented using programming stored within one or more computer-readable storage medium of storage circuitry 26 and configured to control appropriate processing circuitry 24.

The computer-readable storage medium may be embodied in one or more articles of manufacture 27 which can contain, store, or maintain programming, data and/or digital information for use by or in connection with an instruction execution system including processing circuitry 24 in one embodiment. For example, computer-readable storage media may be non-transitory and include any one of physical media such as electronic, magnetic, optical, electromagnetic, infrared or semiconductor media. Some more specific examples of computer-readable storage media include, but are not limited to, a portable magnetic computer diskette, such as a floppy diskette, a zip disk, a hard drive, random access memory, read only memory, flash memory, cache memory, and/or other configurations capable of storing programming, data, or other digital information.

Communications circuitry 28 is arranged to implement communications of the vessel with respect to other external communications systems, such as communications systems of management system 20, a GPS system or other AIS systems. Communications circuitry 28 may be arranged to communicate information bi-directionally with respect to other communications systems.

In one embodiment, communications circuitry 28 of a vessel 12 may be configured to receive GPS signals from one or more GPS satellites and the received GPS signals may be processed to determine positional data of the vessel. Communications circuitry 28 may also include AIS circuitry configured to receive AIS signals from other vessels 12 within a wireless communications range of the AIS circuitry of the vessel 12. The AIS circuitry of a vessel 12 may also transmit AIS signals to other vessels 12.

Communications circuitry 28 may also include additional wireless communications circuitry (e.g., cellular, terrestrial and satellite communications circuitry) to implement wireless communications of a vessel 12 with communications systems 16, 18 in one embodiment. For a given or subject vessel 12, incoming communications received by the subject vessel are referred to as inbound communications and communications transmitted by the subject vessel 12 are referred to as outbound communications. Accordingly, as described above, the communications circuitry 28 may communicate with a plurality of different wireless communications systems (e.g., GPS, AIS, cellular, terrestrial and satellite) in one embodiment.

Management system 20 may be configured similar to the computing system arrangement of FIG. 2 in one embodiment. In a more specific embodiment, management system 20 may be implemented as a server which controls and implements communications with respect to the vessels 12.

User interface 22 of the management system 20 may convey positional data regarding and received from vessels 12 to users, operators or other appropriate personnel. For example, the user interface 22 may include a map and show the vessels 12 upon the map at their respective appropriate locations in accordance with the received positional data of the vessels 12.

Processing circuitry 24 of the management system 20 is configured to process positional data of the vessels 12 and to communicate transmission rules to the vessels 12 to control subsequent communications of the vessels 12 in one embodiment.

Storage circuitry 26 of the management system 20 is configured to store received positional data, transmission rules and information regarding the communications systems of the vessels 12 (e.g., wireless communications ranges of the vessels 12) in one embodiment.

Communications circuitry 28 is configured to communicate with vessels 12 via communications systems 16, 18 in one embodiment.

As mentioned above, it may be desired to reduce the amount of positional data regarding the vessels 12 which is communicated from the vessels 12 to the management system 20. In one embodiment described below, the transmission rules are generated and communicated to the vessels 12 in an effort to reduce the amount of redundant positional data which is communicated from the vessels 12 to the management system 20. In one embodiment, the transmission rules are used to reduce the number of occurrences of communications of redundant positional data regarding the same vessel in different communications compared with the absence of the use of the transmission rules or other control, and accordingly, the use of the transmission rules results in less data being communicated to the management system 20 via communications systems 16, 18 and less bandwidth thereof consumed to provide the positional data of the vessels 12 to the management system during operations of the vessels 12. The reduction of bandwidth used to communicate the positional data may also result in reduced cost in some arrangements.

Figure 3:
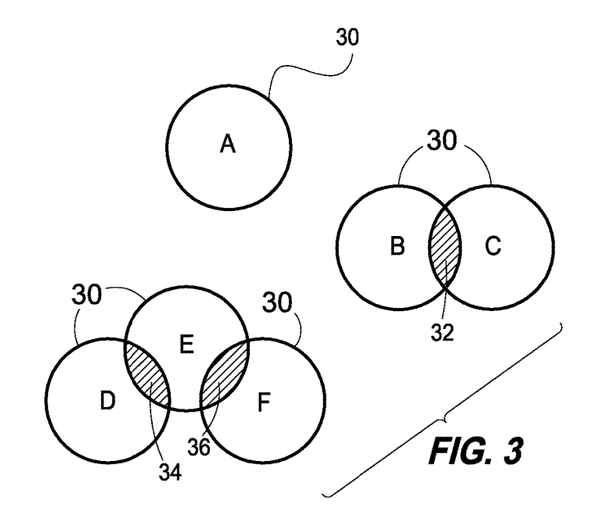
FIGS. 3-6 are illustrative representations of wireless communications ranges of a plurality of vessels.

Referring to FIG. 3, control of communications of a plurality of vessels 12 which are represented using designators A-F is described according to one embodiment. Vessels 12 communicate their respective positional data to the management system 20 at a plurality of moments in time, for example, periodically. Management system 20 may receive and process the positional data from the vessels 12.

In addition, management system 20 may contain information regarding the vessels 12, such as wireless communications ranges of the communications circuitry of the vessels 12. Management system 20 may process the received positional data to generate the transmission rules which control subsequent communications from the vessels to the management system 20 in one embodiment.

FIG. 3 illustrates the locations of the plural vessels A-F at a given moment in time. Each of the vessels A-F includes a respective wireless communications range 30 represented as a circle about the respective vessel A-F which is located at the center of the respective circle. In one embodiment, the wireless communications ranges 30 represent the wireless signal coverages of the AIS receiver circuitry of the respective vessels A-F, and accordingly, represent the ranges of which the respective vessel may receive AIS positional data from other vessels.

As shown in FIG. 3 at one moment in time, vessel A is out of wireless communications range of the other vessels B-F, the wireless communications ranges 30 of vessels B, C partially overlap with one another in a geographical area 32, and the wireless communications range of vessel E partially overlaps with the wireless communications ranges of vessels D, F at geographical areas 34, 36.

Management system 20 uses the received positional data to monitor the locations of the vessels 12 at different moments in time (e.g., continuously while vessels A-F are operating). In addition, management system 20 may use the stored information regarding the communications circuitry of the vessels A-F to determine the wireless communications ranges 30 of the vessels A-F. While the wireless communications ranges 30 are shown in FIG. 3 as substantially the same, the ranges 30 may be different (e.g., and represented by circles having different diameters) if the communications circuitry of the vessels A-F have different wireless communications ranges 30. Also, other vessels may be present near vessels A-F but may not be associated with management system 20 or the communications of such other vessels may not be subject to control by management system 20. Vessels A-F may communicate positional data received by these other vessels to the management system 20 in one embodiment.

Management system 20 may selectively control the wireless communications of the vessels A-F to management system 20. For example, in one embodiment, management system 20 is configured to detect the presence of overlaps 32, 34, 36 of the wireless communications ranges 30, and the management system 20 may operate to control the subsequent communications from the vessels A-F found to have overlapping wireless communications ranges 30 as a result of the detection of the overlapping wireless communications ranges 30. In one more specific embodiment, management system 20 generates transmission rules which are communicated to one or more of the vessels A-F to control the subsequent wireless communications of the vessels A-F.

In one embodiment mentioned above, the wireless communications of vessels A-F are controlled to reduce the communication of redundant positional data regarding the vessels A-F from the vessels A-F to management system 20. For the illustrated example of FIG. 3, the transmission rules may dictate that vessel A always communicates any positional data it receives from other vessels, vessel B communicates any positional data it receives from other vessels, and vessel C communicates any positional data it receives except for vessels located in overlap 32. These example transmission rules would reduce or eliminate communication of redundant positional data of vessels located in overlap 32. In particular, wireless communications from a vessel (e.g., AIS communications including positional data of the vessel) located in overlap 32 would be received by both vessels B, C. In one embodiment, the transmission rules control only one of the vessels B, C to communicate the positional data of the vessel within the overlap 32 to management system 20 to avoid redundant communications of positional data of vessels within overlap 32 by both vessels B, C. In other embodiments, only vessel C may be controlled to communicate positional data from vessels within overlap 32.

In addition to controlling vessels A-C, vessel E may be controlled by the transmission rules to communicate any positional data it receives from other vessels, vessel D may be controlled to communicate any positional data it receives except for vessels located in overlap 34, and vessel F may be controlled to communicate any positional data it receives except for vessels located in overlap 36.

In this example embodiment, the transmission rules control which of the vessels communicate received positional data (e.g., AIS data) to management system 20. The transmission rules may be generated in different ways and/or for different applications (e.g., having different quantity of data or network constraints) and some additional example embodiments are described below.

Figure 4:
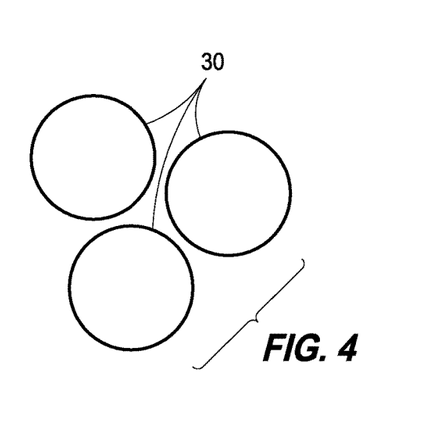
Figure 4A:
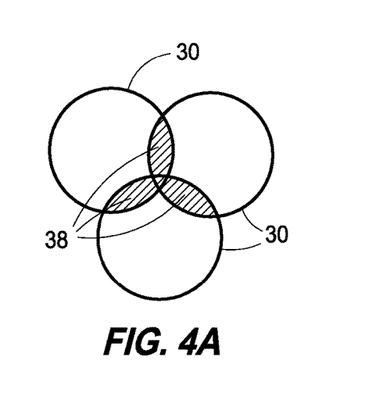

Referring to FIGS. 4 and 4A, aspects of one method for determining the transmission rules using received positional data regarding locations of a plurality of vessels 12 and their respective wireless communications ranges 30 is described. This method may be referred to as a coverage scoring method where non-overlapping geographical areas are assigned a positive score which is proportional to its size and overlapping geographical areas are assigned a negative score which is proportional to its size. The scores are then tallied to get an overall score for the map. The example map of FIG. 4 having three vessels would have a score of three while the example map of FIG. 4A having three vessels with wireless communications ranges 30 which overlap 38 would have a score of 2.6.

The score of a map can be manipulated by excluding certain vessels on the map in one embodiment. When a vessel is excluded from the scoring process, non-overlapping geographical areas attributed to the wireless communications range 30 of the vessel are excluded which brings the overall score down. At the same time, overlapped geographical areas attributed to this vessel potentially could become separate again, thus increasing the overall score. Therefore, by excluding a vessel it is possible to have either a positive or negative effect on the overall score.

Figure 4B:
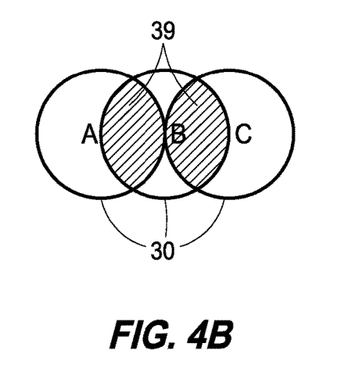

FIG. 4B shows a map where the wireless communications range 30 of vessel B overlaps at geographical areas 39 with the wireless communications ranges of vessels A, B and may be included or excluded from scoring in accordance with the above.

In one embodiment, the coverage scoring method aims to maximize the score for any given map which will maximize overall wireless signal coverage for AIS while minimizing coverage overlap and communication of duplicate data. For any given map there is a most optimal solution that gives the highest possible score but it may be difficult to ascertain in view of vast amounts of data and providing a real-time application (e.g., given x number of vessels, the total number of possible vessel configurations is $2^x$ and there may be too much data for real time computations).

In the presently described example, an approximation of the maximum score may be utilized to determine the transmission rules for use in real time applications. Simulated annealing is used to find a good approximation of the maximum score in one more specific embodiment. Simulated annealing is a probabilistic method for finding a global maximum or minimum of a cost function and additional details are described in Bertsimas, D. and Tsitsiklis, J.; Simulated Annealing. Statistical Science Vol. 8, No. 1, 10-15 (1993), the teachings of which are incorporated herein by reference.

In one implementation, the input of the cost function is a set of vessel configurations (e.g., a set of Booleans corresponding to the transmission state of each vessel) and the output is a score defined above. For a set of 4 vessels, for instance, one set of vessel configurations could be {true, false, false, true}, which indicates vessel 1 and 4 are transmitting data while vessel 2 and 3 are not. Simulated annealing gives a good approximation to the maximum score in a fraction of the time which would be used to calculate the optimal solution. Once simulated annealing finds a score maximizing and the corresponding set of vessel communication configurations, the server issues transmission rules to each of the vessels to turn data transmission on or off for the respective vessels in accordance with the maximum score and the corresponding set of vessel communication configurations.

Figure 5:
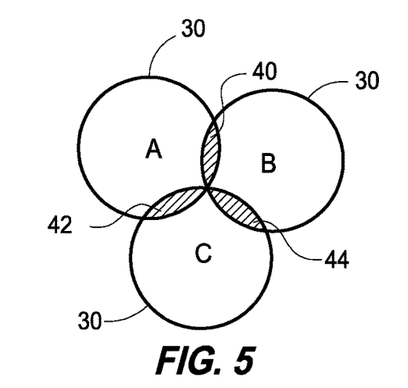

Referring to FIG. 5, another embodiment of determining the transmission rules according to a first claim method is described. In many cases it does not matter which vessel reports positional data from a given region (e.g., overlap) as long as one vessel does. In this example embodiment, the method determines which vessel is responsible for handing overlapped geographical areas and each vessel is randomly given an order for which it will claim any unclaimed overlapped geographical areas within its wireless communications range 30.

In the example of FIG. 5, three vessels A, B, C are shown with overlapped coverage geographical areas 40, 42, 44. Assuming the claiming order is vessel A, vessel B, then vessel C, vessel A would claim both geographical areas 40, 42, and vessel B would claim geographical area 44. The end result in this example is that vessel A would report positional data of all signals received within its coverage area or wireless communications range 30, vessel B would report positional data of all signals received except signals received from vessels within geographical area 40, and vessel C would report positional data of all signals received except signals received from vessels within geographical areas 42, 44.

Once a solution is obtained, the corresponding map configuration is used to determine the transmission rule for each vessel 12. There are three types of spatial rules which may be assigned to vessels 12: Full transmission where all AIS signals received by the vessel in all locations shall be reported back to the management system 20; No transmission: No AIS signal received by the vessel shall be reported back to the management system 20; and Partial transmission: AIS signals received from some locations (not all) are reported back to the management system 20 based on where these signals originated from.

In one embodiment, for a given or subject vessel, the transmission rules define locations of originating AIS communications for which the given or subject vessel will forward the positional data of to the management system. Geographical areas within the wireless communications range 30 of the subject vessel from which positional data of received AIS wireless communications is to be forwarded to the management system 20 may be referred to as active or transmit areas, while other geographical areas of the wireless communications range 30 of the subject vessel from which positional data of received AIS wireless communications is not to be forwarded to the management system 20 may be referred to as inactive or no transmit areas. In the illustrated example of FIG. 5 where the claiming order is vessel A, vessel B, then vessel C, the active or transmit area of vessel C would only be the non-overlapping geographical area and the inactive or no transmit areas would be the geographical areas 42, 44 which overlap with vessels A and B.

Accordingly, in some embodiments, a vessel 12 may select only some of the positional data which is received by the vessel 12 for forwarding to management system 20. In addition, one or more vessels 12 which receive positional data from other vessels 12 may be controlled by the management system 20 to not communicate the received positional data. Also, a given vessel 12 may also include positional data regarding a plurality of vessels 12 within a single wireless communication to management system 20 in some arrangements.

Figure 6:
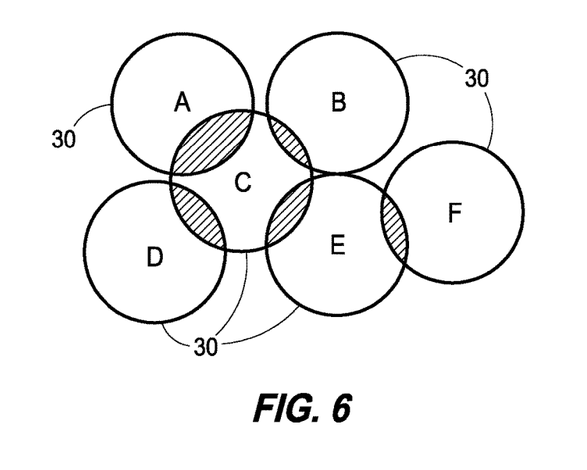

Referring to FIG. 6, vessels A-F with all three types of transmission rules are shown. Vessel A, B, D, and E are full transmission; vessel C is no transmission; and vessel F is partial transmission where only signals originating from vessels within its non-overlapping geographical area are sent back to the management system 20.

In some embodiments, transmission rules may be defined and used to control communications from vessels 12 to the management system based upon the types of vessels 12. For example, a company may own a fleet of vessels 12 of a certain type (e.g., tug boats). In one embodiment, one or more of the vessels 12 of the company may be controlled to only communicate positional data to the management system which was received from other tug boats, and may disregard and not communicate positional data which was received from other types of vessels 12.

In one embodiment, the management system may use the transmission rules to establish a time interval desired for the communication of positional data by the vessels 12 to the management system, and communicate the time interval to the vessels 12 to control subsequent communications from the vessels 12 to the management system, including how often the vessels 12 report positional data to the management system in accordance with the specified time interval. For example, a vessel may receive a plurality of AIS messages from another vessel which include positional data of the other vessel. However, in one embodiment, the receiving vessel may be controlled to only communicate the most recently received positional data regarding the other vessel prior to the communication of the positional data to the management system so the management system receives only the most recent positional data of the vessels 12. This has the effect that not all of the received AIS messages will be communicated to the management system from the vessels 12 even though the criteria defined according to the transmission rules for those messages are met.

Once a transmission rule is established and sent to a vessel, the vessel starts collecting received positional data from other vessels (e.g., positional data within AIS communications from other nearby vessels). In the example embodiment where AIS signals are used, the AIS signal data is first decoded by following the NMEA 0183 specification to extract the origin of the signal, and its coordinates are used against the transmission rules for the receiving vessel to determine whether the positional data included in the AIS communication should be selected and perhaps forwarded to the management system, or discarded and not forwarded to the management system.

In one more specific embodiment, if the location of the vessel which transmitted the AIS communication is within a geographical area defined as a transmit area for the vessel which received the AIS communication, then the receiving vessel will select and forward the positional data of the transmitting vessel which is contained within the AIS communication to the management system. The receiving vessel does not select or forward the positional data of AIS communications which were transmitted from a vessel located in an inactive or no transmit area for the receiving vessel.

In the event that the amount of data collected exceeds network capacity, or that data resolution is deemed excessive for the purpose of the application, the positional data can be sampled at a lower resolution before being sent to the management system 20, thus reducing the amount of network traffic and perhaps cost.

Figure 7:
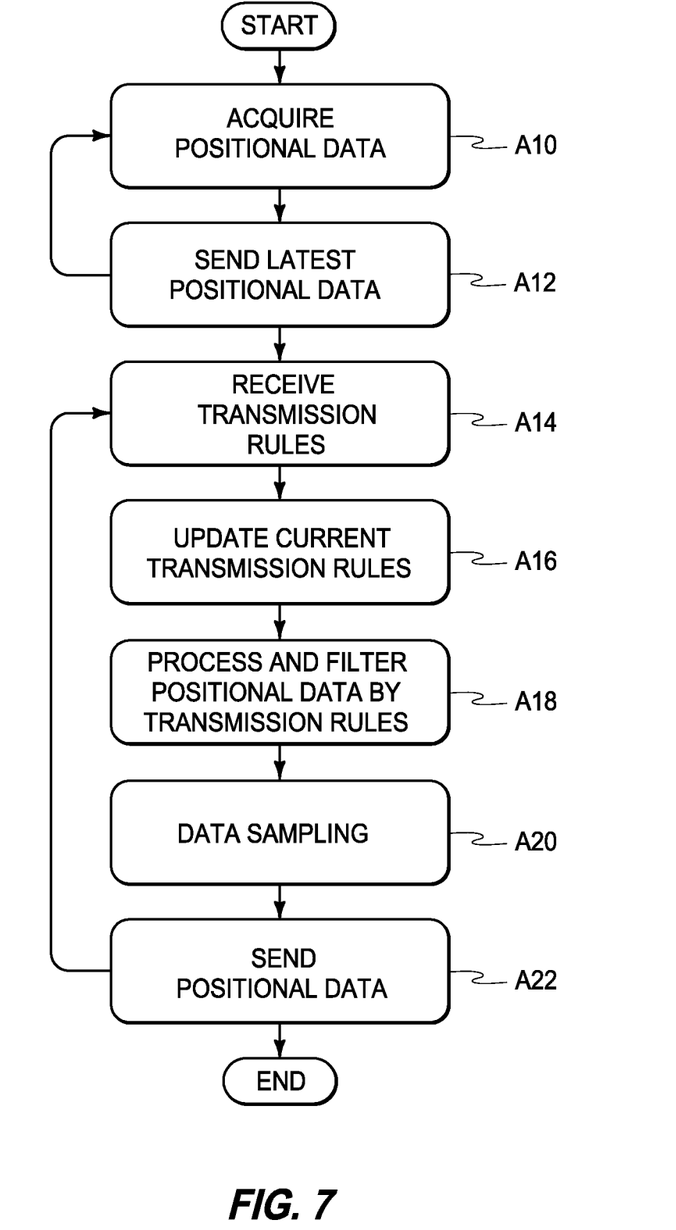
FIG. 7 is a flow chart of a method performed by a vessel according to one embodiment.

Referring to FIG. 7, one method of operations performed by one of a plurality of vessels (referred to as the subject vessel) is shown according to one embodiment. Other methods are possible including more, less and/or alternative acts.

At an act A10, the subject vessel acquires positional data which may include its own positional data (e.g., using GPS circuitry of the subject vessel) as well as positional data from other vessels in the vicinity of the subject vessel (e.g., using AIS receiver circuitry of the subject vessel). The GPS signals and AIS signals received by the subject vessel may be referred to as inbound wireless communications with respect to the subject vessel. In one embodiment, the positional data is acquired at a specified time interval which may be periodic.

At an act A12, the subject vessel communicates the acquired positional data to the management system, for example, using terrestrial or satellite wireless communications. The positional data includes data which is indicative of the locations of the subject vessel and other vessels in the vicinity whose AIS signals were received by the subject vessel.

At an act A14, the subject vessel receives transmission rules from the management system (e.g., using wireless terrestrial or satellite communications) which control the subsequent communications of positional data by the subject vessel to the management system. The transmission rules may specify that the subject vessel communicates all received AIS positional data received from other vessels, no received AIS positional data received from other vessels, or only the received AIS positional data from other vessels which are in geographical areas specifically defined by the transmission rules (e.g., non-overlapping area of the wireless communication range of the AIS receiver circuitry of the subject vessel).

At an act A16, if appropriate, previously utilized transmission rules may be updated with new transmission rules received from the management system.

At an act A18, the subject vessel processes and filters positional data received from other vessels within the vicinity of the subject vessel according to the current transmission rules. For example, the subject vessel may output all, none or some of the AIS positional data received by the subject vessel according to the transmission rules. In one embodiment, inbound AIS wireless communications received by a vessel are decoded and their coordinates of origination are checked against the transmission rules of the vessel to determine whether the positional data should be transmitted back to the central server.

For example, if an inbound wireless communication originated from a location within an active or transmit geographical area of the wireless communications range of the receiving subject vessel, then the positional data included in the communication would be forwarded to the management system. However, for inbound wireless communications originating from locations within an inactive or no transmit geographical area of the wireless communications range of the receiving subject vessel, then the positional data in the communication is considered redundant data (e.g., the positional data would be communicated to the management system by another nearby vessel) and is not communicated to the management system by the receiving subject vessel. Accordingly, in one embodiment, the receiving vessel selects some received positional data to forward to the management system and does not select or forward other received positional data to the management system.

At an act A20, any data sampling may be performed to reduce the amount of data which is to be communicated by the terrestrial or satellite communications to the management system.

At an act A22, the positional data of the subject vessel and AIS positional data of other appropriate vessels in accordance with the transmission rules is communicated using the terrestrial or satellite communications to the management system. In one embodiment, the vessels individually transmit their positional data at a specified periodic time interval to the management system.

Figure 8:
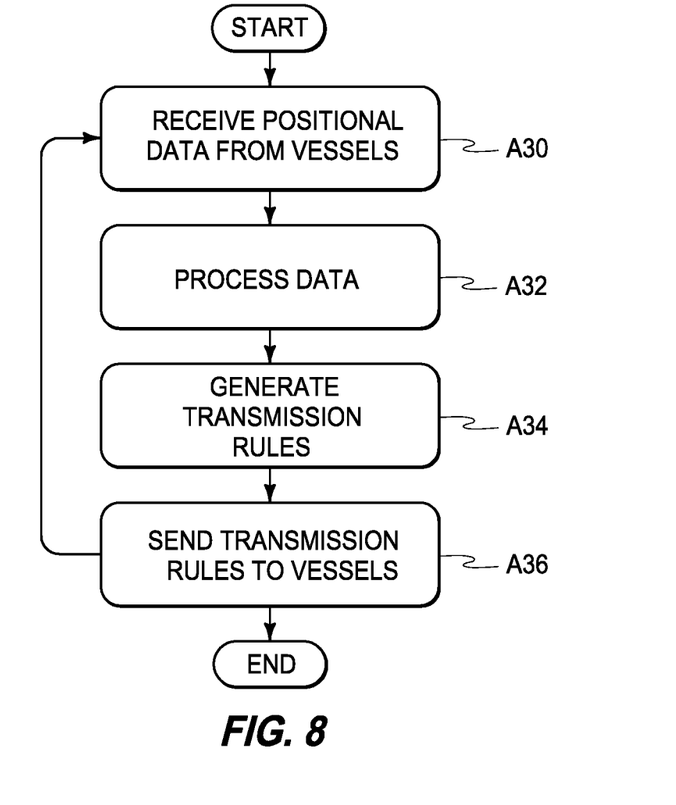
FIG. 8 is a flow chart of a method performed by a management system according to one embodiment.

Referring to FIG. 8, one method of operations performed by the management system is shown according to one embodiment. Other methods are possible including more, less and/or alternative acts.

At an act A30, the management system receives positional data from a plurality of vessels and which is indicative of the locations of the vessels, and may include GPS and AIS positional data in more specific examples.

At an act A32, the management system processes the positional data to determine whether the communications ranges of any of the vessels overlap with one another.

At an act A34, if an overlap is detected in act A32, the management system uses the locations of the vessels to construct a map to maximize overall AIS signal coverage while minimizing coverage overlap and communication of duplicate positional data in one embodiment. The management system defines transmission rules in accordance with the map for each of the vessels to control the communications of the vessels to the management system to reduce the communication of redundant positional data regarding the locations of the vessels.

At an act A36, the transmission rules are sent to the vessels to control the communication of the positional data from the vessels to the management system. The transmission rules may also specify a time interval (periodic or otherwise) or other restrictions (e.g., communicating positional data from only a specified vessel type) for communicating positional data to the management system, and some AIS positional data may not be communicated to the management system even if the spatial criteria of the vessels transmitting the AIS positional data are met as specified by the transmission rules.

In one embodiment, the vessels are continuously communicating with the management system at plural moments in time during operations and movement of the vessels. The positional data may be continuously acquired by the vessels and communicated to the management system enabling the management system to continuously monitor the locations of the vessels. The management system dynamically processes the positional data received from the vessels, monitors the locations of the vessels, creates the transmission rules, dynamically updates the transmission rules as needed, and provides the transmission rules to the vessels to control the subsequent communications of the positional data from the vessels to the management system. In one embodiment, the management system is continuously recalculating the optimal control solution and updating and sending the transmission rules to the vessels as appropriate.

Positional data collected from each vessel may be consolidated by the management system with positional data from other sources and the locations of vessels may be presented in a unified view for example on a map of a geographical area to operators, stored in a database, and/or used for other desired purposes. In at least one embodiment, the disclosure provides a system that aggregates AIS positional data from a fleet of vessels without the use of AIS base stations or satellite AIS receivers.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended aspects appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. A vessel communications method comprising:
   receiving a first inbound wireless communication within a subject vessel, the first inbound wireless communication comprising positional data regarding a location of a first vessel;
   receiving a second inbound wireless communication within the subject vessel, the second inbound wireless communication comprising positional data regarding a location of a second vessel;
   selecting the positional data of the first vessel but not the positional data of the second vessel;
   after the selecting, outputting an outbound wireless communication comprising the positional data of the first vessel but not the positional data of the second vessel; and
   receiving transmission rules within the subject vessel, and the selecting comprises selecting using the transmission rules.

2. The method of claim 1 wherein the selecting comprises selecting as a result of the location of the first vessel being within a first geographical area and the location of the second vessel being within a second geographical area.

3. The method of claim 1 wherein the receiving the transmission rules comprises receiving from a management system as a result of the subject vessel communicating positional data of a location of the subject vessel to the management system.

4. The method of claim 1 wherein the receiving transmission rules comprises receiving as a result of a wireless communications range of the subject vessel overlapping with respective wireless communication ranges of the first and second vessels.

5. The method of claim 1 wherein the transmission rules control the second vessel to wirelessly communicate the second location information directly to the management system from the second vessel.

6. The method of claim 1 wherein the transmission rules control only the first vessel to wirelessly communicate positional data regarding any other vessel located within a specified geographical region.

7. The method of claim 1 wherein the outputting comprises outputting the outbound wireless communication comprising positional data regarding a location of the subject vessel.

8. The method of claim 1 wherein the receivings individually comprise receiving using a first wireless communications system, and wherein the outputting comprises outputting the outbound wireless communication using a second wireless communications system which is different than the first wireless communications system.

9. The method of claim 1 wherein the first and second inbound wireless communications are AIS communications, and the outbound wireless communication is a cellular or satellite communication.

10. The method of claim 1 further comprising receiving a third inbound wireless communication within the subject vessel, the third inbound wireless communication comprising positional data regarding a location of a third vessel, and not including the positional data of the third vessel in the outbound wireless communication as a result of the vessel type of the third vessel.

11. The method of claim 1 wherein the receiving the first inbound wireless communication comprises receiving a plurality of first inbound wireless communications individually comprising positional data of the first vessel, and the outputting comprises outputting the outbound wireless communication comprising only one of the positional data of the plurality of first inbound wireless communications.

12. The method of claim 11 wherein the only one of the positional data is a most recent positional data of the first vessel.

13. A vessel communications method comprising:
   receiving a first inbound wireless communication within a subject vessel, the first inbound wireless communication comprising positional data regarding a location of a first vessel;
   receiving a second inbound wireless communication within the subject vessel, the second inbound wireless communication comprising positional data regarding a location of a second vessel;
   selecting the positional data of the first vessel but not the positional data of the second vessel;
   after the selecting, outputting an outbound wireless communication comprising the positional data of the first vessel but not the positional data of the second vessel; and
   wherein the selecting comprises selecting as a result of the location of the first vessel being within a first geographical area and the location of the second vessel being within a second geographical area.

14. A vessel communications method comprising:

receiving a first inbound wireless communication within a subject vessel, the first inbound wireless communication comprising positional data regarding a location of a first vessel;

receiving a second inbound wireless communication within the subject vessel, the second inbound wireless communication comprising positional data regarding a location of a second vessel;

selecting the positional data of the first vessel but not the positional data of the second vessel;

after the selecting, outputting an outbound wireless communication comprising the positional data of the first vessel but not the positional data of the second vessel; and wherein the receivings individually comprise receiving using a first wireless communications system, and wherein the outputting comprises outputting the outbound wireless communication using a second wireless communications system which is different than the first wireless communications system.

15. A vessel communications method comprising:

receiving a first inbound wireless communication within a subject vessel, the first inbound wireless communication comprising positional data regarding a location of a first vessel;

receiving a second inbound wireless communication within the subject vessel, the second inbound wireless communication comprising positional data regarding a location of a second vessel;

selecting the positional data of the first vessel but not the positional data of the second vessel;

after the selecting, outputting an outbound wireless communication comprising the positional data of the first vessel but not the positional data of the second vessel; and receiving a third inbound wireless communication comprising positional data regarding a location of a third vessel, and not including the positional data of the third vessel in the outbound wireless communication as a result of the vessel type of the third vessel.

16. A vessel communications method comprising:

receiving a first inbound wireless communication within a subject vessel, the first inbound wireless communication comprising positional data regarding a location of a first vessel;

receiving a second inbound wireless communication within the subject vessel, the second inbound wireless communication comprising positional data regarding a location of a second vessel;

selecting the positional data of the first vessel but not the positional data of the second vessel;

after the selecting, outputting an outbound wireless communication comprising the positional data of the first vessel but not the positional data of the second vessel; and wherein the receiving the first inbound wireless communication comprises receiving a plurality of first inbound wireless communications individually comprising positional data of the first vessel, and the outputting comprises outputting the outbound wireless communication comprising only one of the positional data of the plurality of first inbound wireless communications.

17. The method of claim 16 wherein the only one of the positional data is a most recent positional data of the first vessel.

* * * * *